United States Patent
Magoteaux

[11] Patent Number: 5,782,481
[45] Date of Patent: Jul. 21, 1998

[54] VEHICLE OCCUPANT PROTECTION APPARATUS

[75] Inventor: David G. Magoteaux, Mesa, Ariz.

[73] Assignee: TRW Inc., Lyndhurst, Ohio

[21] Appl. No.: 740,719

[22] Filed: Nov. 4, 1996

[51] Int. Cl.$^6$ .................................. B60R 21/16
[52] U.S. Cl. ........................ 280/728.2; 280/731
[58] Field of Search ................ 280/728.2, 728.3, 280/731, 732

[56] References Cited

U.S. PATENT DOCUMENTS

| | | | |
|---|---|---|---|
| 4,334,699 | 6/1982 | Patzelt et al. | 280/731 |
| 4,828,286 | 5/1989 | Fohl | 280/731 |
| 4,913,461 | 4/1990 | Cuevas | 280/131 |
| 5,184,843 | 2/1993 | Berger et al. | 280/728.2 |
| 5,186,492 | 2/1993 | Wright et al. | 280/728.2 |
| 5,388,858 | 2/1995 | Cuevas | 280/728.2 |
| 5,435,593 | 7/1995 | Hiramitsu et al. | 280/728.2 |
| 5,588,666 | 12/1996 | Numata | 280/728.2 |
| 5,620,201 | 4/1997 | Ricks | 280/728.2 |

*Primary Examiner*—Kenneth R. Rice
*Attorney, Agent, or Firm*—Tarolli Sundheim, Covell, Tummino & Szabo

[57] ABSTRACT

An air bag module (16) includes an inflator (12) and a reaction plate (60). A fastener (66) interconnects the inflator (12) and the reaction plate (60). The air bag module (16) further includes a cover (50) and a clip (70). The cover (50) defines a pivotal deployment door (52), and has a side wall (150) spaced from the fastener (66). The clip (70) is attached to the reaction plate (60) by the fastener (66), and extends from the fastener (70) to the side wall (150) of the cover (50). The clip (70) engages the side wall (150) of the cover (50) to interconnect the cover (50) and the reaction plate (60).

23 Claims, 4 Drawing Sheets

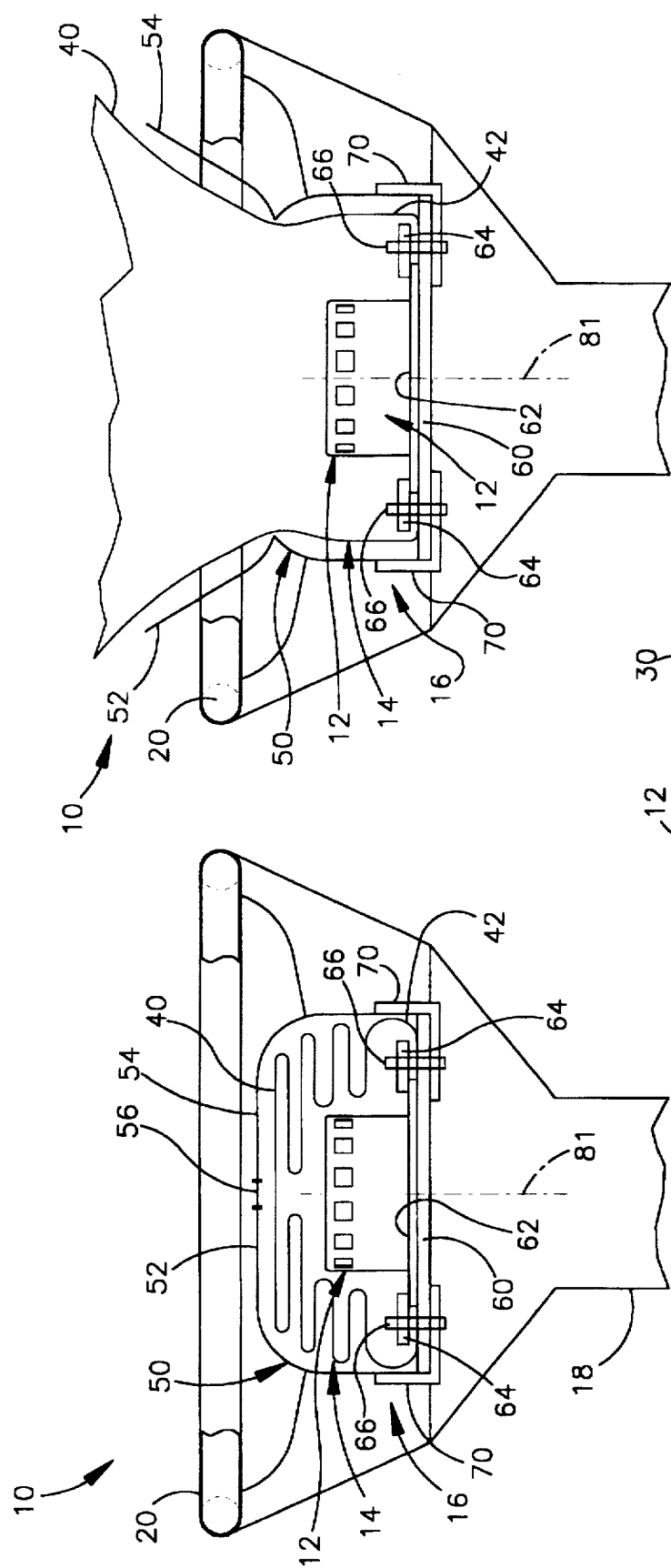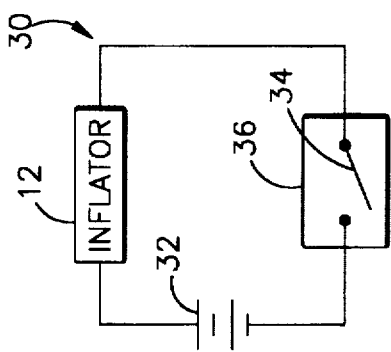

5,782,481

VEHICLE OCCUPANT PROTECTION APPARATUS

FIELD OF THE INVENTION

The present invention relates to an apparatus for protecting an occupant of a vehicle, and particularly relates to an apparatus including an inflatable vehicle occupant protection device.

BACKGROUND OF THE INVENTION

An inflatable vehicle occupant protection device, such as an air bag, is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment to help protect an occupant of the vehicle from a forceful impact with parts of the vehicle as a result of the crash.

An air bag and an inflator are typically assembled together as parts of an air bag module which is separate from the crash sensor. The air bag module is located in the vehicle adjacent to the vehicle occupant compartment. For example, a passenger side air bag module may be located in the vehicle instrument panel. A driver's side air bag module may be located on the vehicle steering column.

In addition to the air bag and the inflator, an air bag module typically includes a cover. The cover defines at least one deployment door which extends over the air bag to conceal the air bag and the other parts of the module from the vehicle occupant compartment.

When the inflation fluid emitted from the inflator begins to inflate the air bag, it moves the air bag forcefully outward against the deployment door on the cover. The cover is ruptured by the force of the fluid pressure acting on the air bag. The deployment door is then moved pivotally out of the path of the air bag as the inflation fluid continues to inflate the air bag outward from the cover and into the vehicle occupant compartment. In addition to rupturing the cover to open the deployment door, the force of the fluid pressure tends to pull the cover away from the other parts of the module.

SUMMARY OF THE INVENTION

In accordance with the present invention, an apparatus comprises an inflator, a reaction plate, and an inflatable vehicle occupant protection device. A fastener interconnects the protection device and the inflator with the reaction plate. The apparatus further includes a cover and a clip. The cover defines a pivotal deployment door, and has a portion spaced from the fastener. The clip is attached to the reaction plate by the fastener, and extends from the fastener to the spaced portion of the cover. The clip engages the spaced portion of the cover to interconnect the cover and the reaction plate.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a vehicle occupant protection apparatus comprising a preferred embodiment of the present invention;

FIG. 2 is a view showing the apparatus of FIG. 1 in an actuated condition;

FIG. 3 is a schematic view of an electrical circuit including parts of the apparatus of FIG. 1;

DESCRIPTION OF PREFERRED EMBODIMENTS

Figure 4:
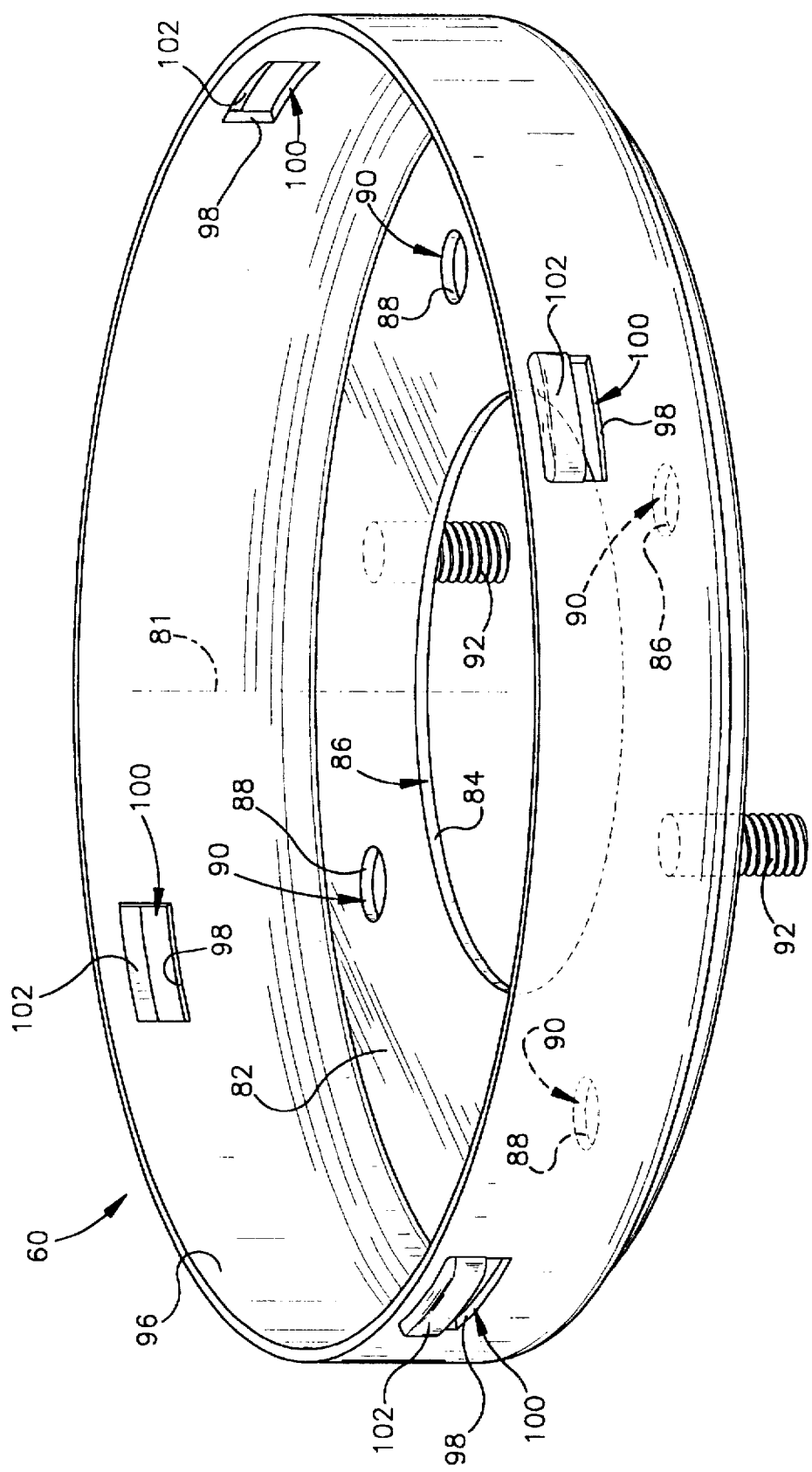
FIG. 4 is a perspective view of a part of the apparatus of FIG. 1.

A vehicle occupant protection apparatus 10 comprising a preferred embodiment of the present invention is shown schematically in FIGS. 1 and 2. The apparatus 10 includes an inflator 12 and a particular type of inflatable vehicle occupant protection device 14 which is commonly referred to as an air bag. The air bag 14 and the inflator 12 are parts of an air bag module 16 which is mounted on a vehicle steering column 18 near the center of the steering wheel 20.

The air bag 14 is inflatable from a folded, uninflated condition, as shown in FIG. 1, to an unfolded, inflated condition, as shown partially in FIG. 2. When the air bag 14 is being inflated, it moves toward the driver of the vehicle. The air bag 14 then restrains movement of the driver toward the steering wheel 20 to help protect the driver from a forceful impact with the steering wheel 20 or other parts of the vehicle.

The inflator 12 comprises a source of inflation fluid for inflating the air bag 14. In the preferred embodiment of the present invention, the inflator 12 contains an ignitable gas generating material which, when ignited, generates a large volume of inflation gas. The inflator 12 may alternatively contain a stored quantity of pressurized inflation fluid, or a combination of pressurized inflation fluid and ignitable material for heating the inflation fluid.

When the air bag module 16 is installed on the steering column 18, the inflator 12 is included in an electrical circuit 30 (FIG. 3) with a power source 32 and a normally open switch 34. The power source 32 is preferably the vehicle battery. The switch 34 is part of a sensor 36 which senses a condition indicating the occurrence of a vehicle crash. Such a condition may comprise, for example, sudden vehicle deceleration caused by a crash. If the crash-indicating condition is at or above a predetermined threshold level, it indicates the occurrence of a crash having at least a predetermined threshold level of severity. The threshold level of crash severity is a level at which inflation of the air bag 14 is desired to restrain movement of the driver of the vehicle, as described above. The switch 34 then closes, and electric current is directed through the inflator 12 to actuate the inflator 12. As a result, the inflator 12 rapidly emits a large volume of inflation gas which flows into the air bag 14 to inflate the air bag 14.

In the schematic views of FIGS. 1 and 2, air bag 14 is shown to have a major portion 40 and an inlet portion 42. When the air bag 14 is being inflated from the condition of FIG. 1 to the condition of FIG. 2, the major portion 40 of the air bag 14 moves outward from the steering wheel 20 toward the driver of the vehicle. The inlet portion 42 of the air bag 14 is retained on the steering column 18 with the inflator 12.

Another part of the air bag module 16 is a cover 50 which encloses the air bag 14 and the inflator 12. The cover 50 is made of a flexible plastic material which may have any suitable composition known in the art. The structure of the cover 50 defines first and second deployment door panels 52 and 54 which extend over the air bag 14. The deployment door panels 52 and 54 are held in closed positions, as shown in FIG. 1, by a predefined rupturable section 56 of the cover 50. As the inflation gas emitted from the inflator 12 begins to inflate the air bag 14, the gas moves the major portion 40 of the air bag 14 forcefully against the cover 50. The rupturable section 56 of the cover 50 ruptures under stress induced by the force of the gas pressure acting outward against the air bag 14. The major portion 40 of the air bag 14 then moves the deployment door panels 52 and 54 pivotally outward, as shown in FIG. 2, as the inflation gas continues to inflate the air bag 14 outward from the steering wheel 20 toward the driver of the vehicle. Although the cover 50 is shown as having two deployment door panels 52 and 54, it could alternatively have only a single deployment door panel or more than two deployment door panels, as known in the art.

As shown schematically in FIGS. 1 and 2, the air bag module 16 further includes a reaction plate 60 which supports the other parts of the module 16. The inlet portion 42 of the air bag 14, as well as a flange portion 62 of the inflator 12, is clamped against the reaction plate 60 by a retainer ring 64 and a plurality of fasteners 66. A plurality of clips 70 also are attached to the reaction plate 60 by the fasteners 66. The clips 70 engage the cover 50 to interconnect the cover 50 and the reaction plate 60 with each other. The preferred embodiment of the present invention includes four such clips 70, as described fully below.

As shown in greater detail in FIG. 4, the reaction plate 60 has a circular shape centered on an axis 81. An annular base wall 82 of the reaction plate 60 has an inner edge surface 84 defining a circular opening 86 centered on the axis 81. The base wall 82 further has four smaller inner edge surfaces 88, each of which defines a corresponding circular opening 90 which is smaller than the central opening 86. The smaller openings 90 are equally spaced radially from the central opening 86, and are uniformly spaced apart circumferentially about the axis 81. Additionally, two threaded mounting studs 92 are fixed to the base wall 82, and project axially downward from the base wall 82 at diametrically opposed locations that are centered between adjacent pairs of the smaller circular openings 90. The mounting studs 92 can be used to mount the reaction plate 60 on another part of the air bag module 16, such as a spring-loaded horn switch assembly (not shown), or to mount the module 16 on the steering wheel 20 or steering column 18, as known in the art.

A short, cylindrical side wall 96 of the reaction plate 60 projects axially upward, as viewed in FIG. 4, from the periphery of the base wall 82. The side wall 96 has four inner edge surfaces 98 defining four corresponding slots 100. The slots 100 also are uniformly spaced apart circumferentially about the axis 81, and are radially aligned with, i.e., circumferentially adjacent to, the smaller circular openings 90 in the base wall 82. The side wall 96 further has four tab portions 102, each of which projects radially outward above a corresponding slot 100.

Figure 5:
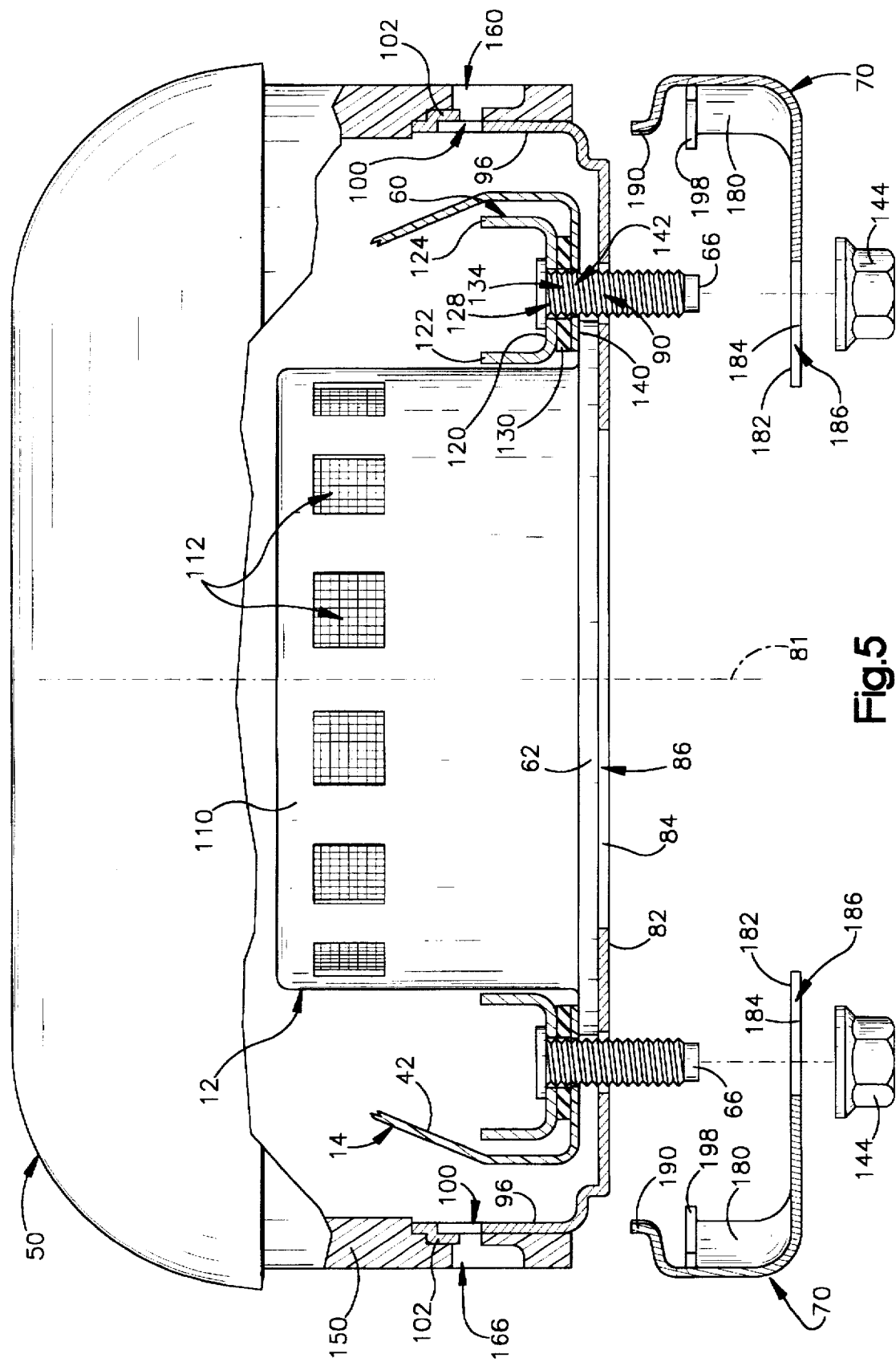
FIG. 5 is a partial side view of parts of the apparatus of FIG. 1, with several parts being shown in an interconnected relationship.

The foregoing parts of the air bag module 16 are shown together in greater detail in FIG. 5. The inflator 12 has a cylindrical housing 110 centered on the axis 81. A circumferentially extending array of gas outlet openings 112 is located near one end of the housing 110. The flange 62 (FIG. 1) on the inflator 12 projects radially outward at the other end of the housing 110, and lies upon the base wall 82 of the reaction plate 60 radially outward of the central opening 86.

In this arrangement, the central opening 86 provides access for connection of the inflator 12 in the electrical circuit 30 (FIG. 3).

The retainer ring 64 has a channel-shaped radial cross-section defined by a major portion 120 and a pair of radially opposed, upstanding rim portions 122 and 124. Four circular openings 128 extend through the major portion 120 of the retainer ring 60. The four openings 128 in the retainer ring 64 are aligned with the four openings 90 in the base wall 82 of the reaction plate 60 (FIG. 4). An elastomeric spacer ring 130 is located concentrically beneath the retainer ring 64 in abutment with the major portion 120 of the retainer ring 64. The retainer ring 64 and the spacer ring 130 together encircle the inflator housing 110, and partially overlie the flange 62. Four circular openings 134 extend through the spacer ring 130. Those openings 134 also are aligned with the openings 90 in the base wall 82 of the reaction plate 60.

Figure 6:
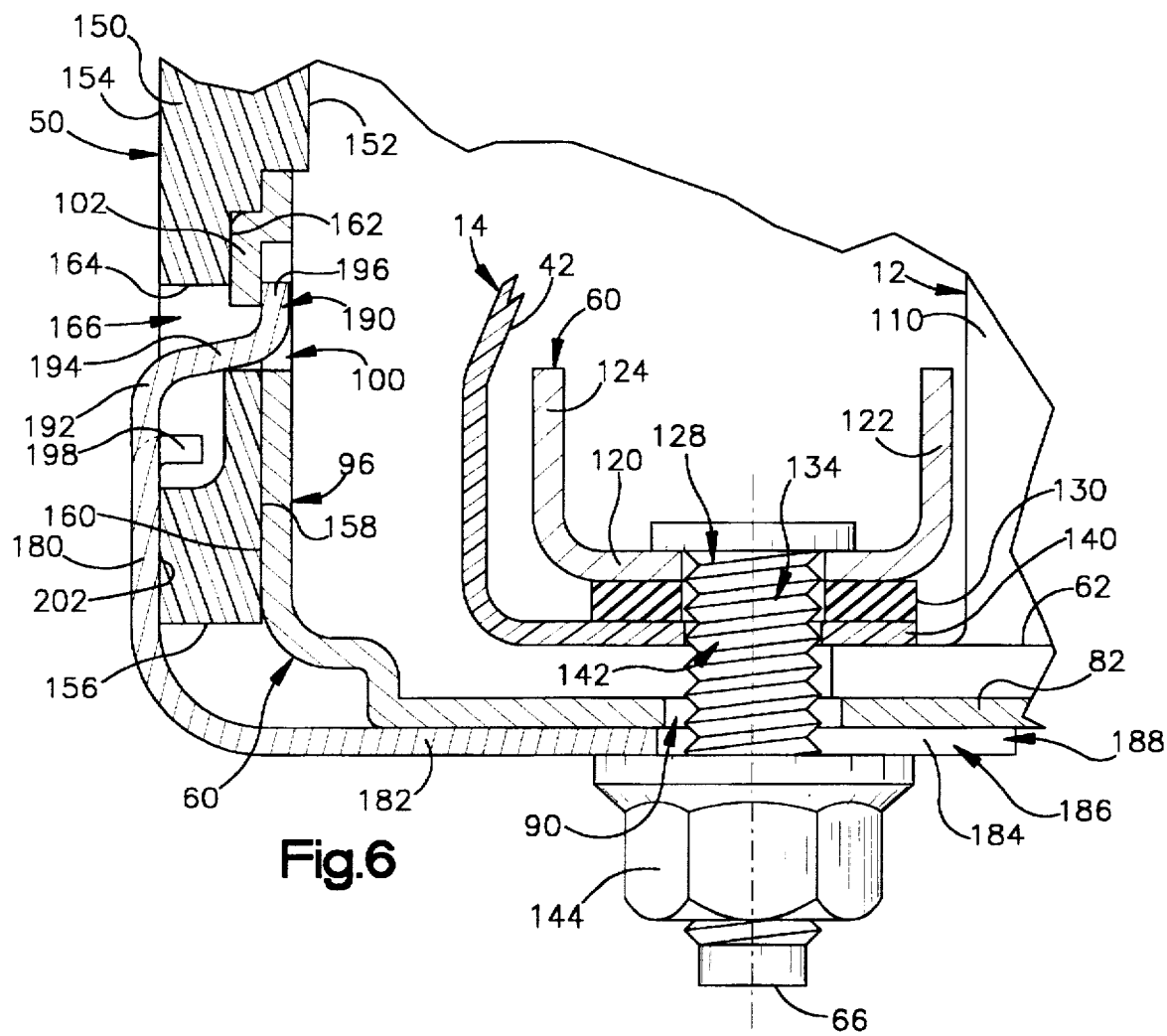
FIG. 6 is an enlarged partial view of the parts shown in FIG. 5 with additional parts being shown in an interconnected relationship.

The inlet portion 42 of the air bag 14 has an annular edge section 140 which is received between the spacer ring 130 and the flange 62 on the inflator 12. The fasteners 66 extend through the aligned openings 128, 134 and 90 in the retainer ring 64, the spacer ring 130 and the reaction plate 60, respectively, and further through aligned openings 142 in the edge section 140 of the air bag 14. In the preferred embodiment of the present invention shown in the drawings, the fasteners 66 are threaded bolts that receive threaded nuts 144. When the nuts 144 have been tightened onto the bolts 66, as shown in FIG. 6, the edge section 140 of the air bag 14 and the flange 62 on the inflator 12 are securely clamped between the retainer ring 64 and the base wall 82 of the reaction plate 60.

The cover 50 has a cylindrical side wall 150 extending closely around the outside of the cylindrical side wall 96 of the reaction plate 60. As best shown in enlarged detail in FIG. 6, the side wall 150 of the cover 50 has a cylindrical inner surface 152, a cylindrical outer surface 154, and an annular lower edge surface 156.

The inner surface 152 of the side wall 150 has a recessed portion 158 which extends around the entire circumference of the side wall 150. The recessed surface portion 158 adjoins the side wall 96 of the reaction plate 60 at an outer surface 160 of the side wall 96. Four smaller recessed portions 162 of the inner surface 152, one of which is shown in FIG. 6, are uniformly spaced apart around the circumference of the side wall 150. The smaller recessed surface portions 160 adjoin the side wall 96 of the reaction plate 60 at the tab portions 102 of the side wall 96. The tab portions 102 are thus received in the recesses defined by the surface portions 160. Additionally, four inner edge surfaces 164 of the side wall 150, one of which also is shown in FIG. 6, define four corresponding openings 166 extending through the side wall 150. The openings 166 in the sidewall 150 of the cover 50 are located circumferentially adjacent to the slots 100 in the side wall 96 of the reaction plate 60.

Figure 7:
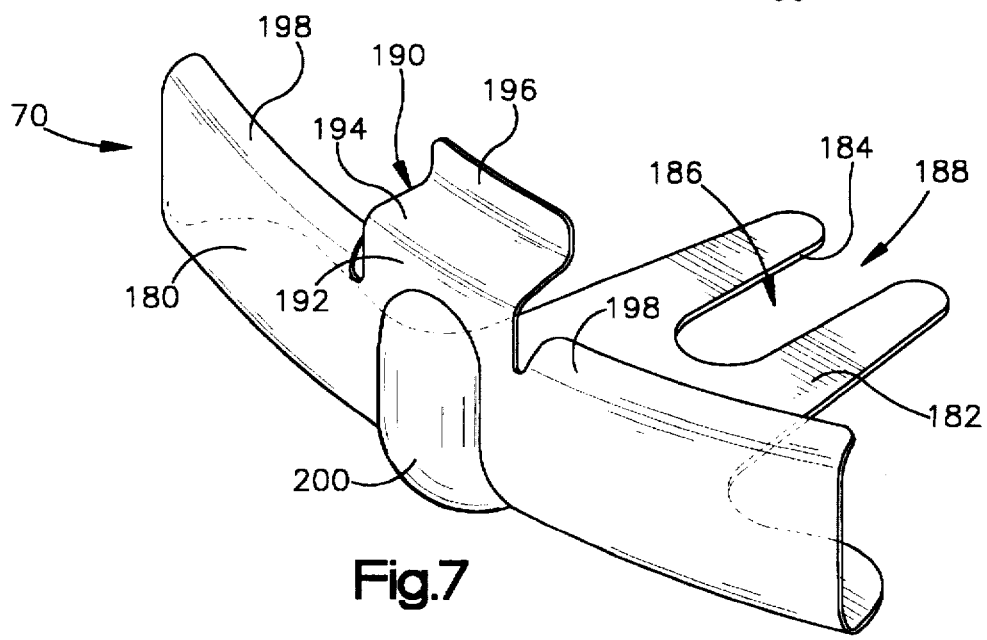
FIG. 7 is a perspective view of another part of the apparatus of FIG. 1.

The clips 70 are alike. As best shown with reference to one of the clips 70 in FIG. 7, each clip 70 has an arcuate side portion 180 and a planar base portion 182 projecting inward from the side portion 180. An edge surface 184 of the base portion 182 defines a slot 186 with an open end 188. The clip 70 further has a centrally located tab 190. A lower section 192 of the tab 190 projects upward from the side portion 180 of the clip 70. An intermediate section 194 of the tab 190 projects upward and inward from the lower section 192. An upper section 196 of the tab 190 projects upward from the intermediate section 194. Moreover, the side portion 180 of the clip 70 includes a pair of flanges 198 which project inward on opposite sides of the tab 190. A reinforcing rib 200 is formed beneath the tab 190.

Each clip 70 has an installed position in which it interconnects the housing 50 and the reaction plate 60, as noted above. This is best shown by way of example with reference to one of the clips 70 in FIG. 6. Accordingly, when a clip 70 is in its installed position, the corresponding bolt 66 extends through the slot 186 in the base portion 182 of the clip 70. The nut 144 on the bolt 66 securely clamps the base portion 182 of the clip 70 against the base wall 82 of the reaction plate 60 at the lower side of the base wall 82. The side portion 180 of the clip 70 engages both the side wall 150 of the cover 50 and the adjacent side wall 96 of the reaction plate 60.

Specifically, the side portion 180 of the clip 70 has an inner surface 202 abutting the outer surface 154 of the side wall 150. The side portion 180 of the clip 70 thus holds the side wall 150 of the cover 50 firmly against the side wall 96 of the reaction plate 60. The flanges 198 on the side portion 180 on the clip 70 project into the corresponding opening 166 in the side wall 150 of the cover 50. The flanges 198 are thus located so as to limit movement of the side wall 150 upwardly from the reaction plate 60 under the influence of the inflating air bag 14.

The lower portion 192 of the tab 190 also extends into the corresponding opening 166 in the side wall 150 of the cover 50. The intermediate portion 194 of the tab 190 extends upward and inward through the aligned slot 100 in the side wall 96 of the reaction plate 60. The upper portion 196 of the tab 190 extends upward beside the corresponding tab 102 on the side wall 96. The clip 70 thus extends from the bolt 66 to the side wall 150 of the cover to interlock the adjacent side walls 150 and 96 with each other, and thereby to interconnect the cover 50 and the reaction plate 60 in cooperation with the bolt 66 and the nut 144.

In accordance with a particular feature of the present invention, each clip 70 is moved to its installed position by first inserting the upper portion 196 of the tab 190 inward through the corresponding opening 166 in the cover 50, and further inward through the aligned slot 100 in the reaction plate 60. The clip 70 is then rotated counterclockwise, as viewed in FIG. 7, so as to turn the upper portion 196 of the tab 190 upward beside the corresponding tab 102 on the reaction plate 60. Such rotation of the clip 70 simultaneously moves the base portion 182 of the clip 70 upward toward the base wall 82 of the reaction plate 60. The corresponding bolt 66 is received in the slot 186 through the open end 188 of the slot 186 as the base portion 182 of the clip 70 is moved toward the base wall 82 of the reaction plate 60 in this manner. When the base portion 182 of the clip 70 reaches the base wall 82 of the reaction plate 60, the clip 70 engages both the reaction plate 60 and the cover 50 in a mechanically interlocked condition. This mechanically interlocked condition is secure enough for the clip 70 to remain in the installed position of FIG. 6 during handling of the module 16 as the nuts 144 are being screwed and tightened on to the bolts 66.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   an inflator;
   a reaction plate;
   a fastener interconnecting said inflator and said reaction plate;
   a cover defining a pivotal deployment door, said cover having a portion spaced from said fastener; and
   a clip attached to said reaction plate by said fastener, said clip extending from said fastener to said portion of said cover and engaging said portion of said cover to interconnect said cover and said reaction plate.

2. Apparatus as defined in claim 1 wherein said clip comprises means for engaging said cover and said reaction plate in a mechanically interlocked condition prior to being attached to said reaction plate by said fastener.

3. Apparatus as defined in claim 1 wherein said clip extends through an opening in said portion of said cover.

4. Apparatus as defined in claim 3 wherein said clip further extends through an opening in said reaction plate.

5. Apparatus as defined in claim 4 wherein said opening in said reaction plate is aligned with said opening in said portion of said cover.

6. Apparatus as defined in claim 1 wherein said clip has a slot along which said fastener is movable relative to said clip upon movement of said clip into interlocking engagement with said cover and said reaction plate.

7. Apparatus as defined in claim 1 wherein said fastener is one of a plurality of identical fasteners interconnecting said inflator and said reaction plate, said clip being one of a plurality of identical clips, each of said clips extending from a corresponding one of said fasteners to said cover to interconnect said cover and said reaction plate.

8. Apparatus as defined in claim 1 further comprising an inflatable vehicle occupant protection device, said fastener further interconnecting said protection device and said reaction plate.

9. Apparatus comprising:
   an inflatable vehicle occupant protection device;
   a reaction plate;
   an inflator supported on said reaction plate;
   a fastener interconnecting said protection device and said reaction plate;
   a cover defining a pivotal deployment door, said cover having a portion spaced from said fastener; and
   a clip attached to said reaction plate by said fastener, said clip extending from said fastener to said portion of said cover and engaging said portion of said cover to interconnect said cover and said reaction plate.

10. Apparatus as defined in claim 9 wherein said clip comprises means for engaging said cover and said reaction plate in a mechanically interlocked condition prior to being attached to said reaction plate by said fastener.

11. Apparatus as defined in claim 9 wherein said clip extends through an opening in said portion of said cover.

12. Apparatus as defined in claim 11 wherein said clip further extends through an opening in said reaction plate.

13. Apparatus as defined in claim 12 wherein said opening in said reaction plate is aligned with said opening in said portion of said cover.

14. Apparatus as defined in claim 9 wherein said clip has a slot along which said fastener is movable relative to said clip upon movement of said clip into interlocking engagement with said cover and said reaction plate.

15. Apparatus as defined in claim 9 wherein said fastener is one of a plurality of identical fasteners interconnecting said protection device and said reaction plate, said clip being one of a plurality of identical clips, each of said clips extending from a corresponding one of said fasteners to said cover to interconnect said cover and said reaction plate.

16. Apparatus as defined in claim 15 wherein each of said fasteners further interconnects said inflator and said reaction plate.

17. Apparatus comprising:

a reaction plate having a base wall and a side wall projecting from said base wall;

an inflator supported on said base wall of said reaction plate;

a cover defining a pivotal deployment door, said cover having a side wall adjacent to said side wall of said reaction plate;

a clip; and a fastener attaching said clip to said base wall of said reaction plate at a location spaced from said side wall of said reaction plate;

said clip extending from said fastener to said adjacent side walls of said cover and said reaction plate, said clip further extending through aligned openings in said adjacent side walls and engaging said adjacent side walls to interconnect said cover and said reaction plate.

18. Apparatus as defined in claim 17 wherein said clip comprises means for engaging said cover and said reaction plate in a mechanically interlocked condition prior to being attached to said reaction plate by said fastener.

19. Apparatus as defined in claim 17 wherein said fastener interconnects said inflator and said reaction plate.

20. Apparatus as defined in claim 19 wherein said fastener is one of a plurality of identical fasteners interconnecting said inflator and said reaction plate, said clip being one of a plurality of identical clips, each of said clips extending from a corresponding one of said fasteners to said cover to interconnect said cover and said reaction plate.

21. Apparatus as defined in claim 20 further comprising an inflatable vehicle occupant protection device, each of said fasteners further interconnecting said protection device and said reaction plate.

22. Apparatus as defined in claim 17 further comprising an inflatable vehicle occupant protection device, said fastener interconnecting said protection device and said reaction plate.

23. Apparatus as defined in claim 22 wherein said fastener is one of a plurality of identical fasteners interconnecting said protection device and said reaction plate, said clip being one of a plurality of identical clips, each of said clips extending from a corresponding one of said fasteners to said cover to interconnect said cover and said reaction plate.

* * * * *